(12) United States Patent
Abel et al.

(10) Patent No.: US 6,233,919 B1
(45) Date of Patent: May 22, 2001

(54) FORCE DRIVEN HOT GAS PROPORTIONAL THRUSTER VALVE

(75) Inventors: Stephen G. Abel, Chandler; William F. Ryan, Phoenix; Michael A. Pepe, Tempe; Joseph P. Silk; Douglas T. Hopper, both of Chandler, all of AZ (US)

(73) Assignee: Honeywell International, Inc., Morris Township, NJ (US)

( * ) Notice: Subject to any disclaimer, the term of this patent is extended or adjusted under 35 U.S.C. 154(b) by 0 days.

(21) Appl. No.: 09/640,232

(22) Filed: Aug. 16, 2000

Related U.S. Application Data

(63) Continuation of application No. 09/501,887, filed on Feb. 10, 2000, now abandoned.

(51) Int. Cl.[7] ............................. B63H 11/00; F02K 3/00
(52) U.S. Cl. ......................... 60/204; 60/233; 60/242; 239/265.19
(58) Field of Search ..................... 60/204, 233, 242; 239/265.19

(56) References Cited

U.S. PATENT DOCUMENTS

| | | | |
|---|---|---|---|
| 3,330,114 | * 7/1967 | McQueen | 60/204 |
| 3,848,806 | * 11/1974 | Samuelson et al. | 239/265.11 |
| 3,910,314 | 10/1975 | Nicholson . | |
| 4,826,104 | * 5/1989 | Bennet et al. | 239/265.19 |
| 4,922,963 | 5/1990 | Robinson . | |
| 5,117,868 | 6/1992 | Wagner . | |
| 5,240,041 | 8/1993 | Garnjost . | |

OTHER PUBLICATIONS

Design Applications: *Hydraulic Feedback Loop Eliminates Valve's Electronics*, Charles J. Murray, (Design News Dec. 7, 1992).

* cited by examiner

Primary Examiner—Charles G. Freay
(74) Attorney, Agent, or Firm—Keith Newburry, Esq.

(57) ABSTRACT

A thruster valve has a continuously positionable piston between a closed position and a maximum open position. The piston moves in response to the difference in pressure between the pressure of the valve's inlet and thruster nozzle and the pressure behind the piston. A pivotable flapper valve regulates this pressure difference. When a change in thrust is required a force is applied to the flapper causing a change in this pressure difference which causes the piston to move until the desired thrust level is obtained.

19 Claims, 2 Drawing Sheets

FORCE DRIVEN HOT GAS PROPORTIONAL THRUSTER VALVE

CROSS REFERENCE TO RELATED APPLICATION

This application is a continuation of U.S. patent application Ser. No. 09/501,887 filed on Feb. 10, 2000 now abandoned.

FIELD OF THE INVENTION

The present invention relates generally to gas valves and in particular to proportionally controlled gas thruster valves.

BACKGROUND OF THE INVENTION

Rockets and missiles are often guided by hot gas thruster valves that expel hot gas generated by the combusting of a solid propellant. Because of the difficulty associated with controlling and containing the hot gas, these valves are generally configured as on/off valves or pulse width modulated valves. A disadvantage to these types of valves is that their abrupt movement, on and off, can cause undesirable vibration and jitter in the vehicle and/or in the vehicle's guidance system. Another disadvantage is that these valves either provide maximum thrust or zero thrust and do not have the capability of providing a thrust level in between. In addition, the pressure of the hot gas is dependent upon the exhaust area of these valves, and is thus subject to the ripple creating an uncertainty in pressure level. A system of proportional valves can provide trimming of the exhaust area, which in turn allows pressure control of the solid propellant motor. This feature can be exploited to also provide mission extension by selectively effecting high and low pressure, or high and low flow segments of the overall mission. This leads to longer range and higher efficiency of the rocket or missile. On/off valves lack this capacity.

Accordingly, a need exists for a hot gas thruster valve that can operate smoothly and also provide intermediate thrust levels and solid propellant gas generator pressure control.

SUMMARY OF THE INVENTION

An object of the present invention is to provide a force driven proportionally controlled thruster valve capable of providing intermediate levels of thrust as a function of a force input into the valve.

Another object of the present invention is to provide a method for continuously controlling the output of a thruster valve.

The present invention accomplishes these objects by providing a thruster valve having an inlet passage receiving a flow of propulsive gas and a thrust nozzle for generating thrust by expelling the gas. A poppet piston slideably mounted in a sleeve is disposed between the inlet passage and the thrust nozzle so as to control the flow of gas therebetween. Behind the piston is an actuator chamber. A change in the difference between the pressure in the thrust nozzle, the pressure in the inlet annulus, and the pressure in the actuator chamber causes the piston to move. This change is brought about by a change in a force balance on a flapper pivotally mounted in a flapper chamber in the valve. The force balance comprises a force input from a solenoid onto the flapper counterbalanced by the spring force of a resilient member, a nozzle pressure force and an actuation pressure force. Actuation pressure is set by a variable inlet restriction, effected by piston motion, and a variable outlet restriction, effected by flapper motion. Importantly, there is a known relationship between the input force and thrust out the thrust nozzle. When a change in thrust is required, the force input moves the flapper changing the pressure ratio across the piston which causes the piston to move. Because this pressure ratio is tied to the thrust level, once the piston reaches the position that results in the desired thrust, the force balance will be restored on the flapper and the piston will stop moving.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
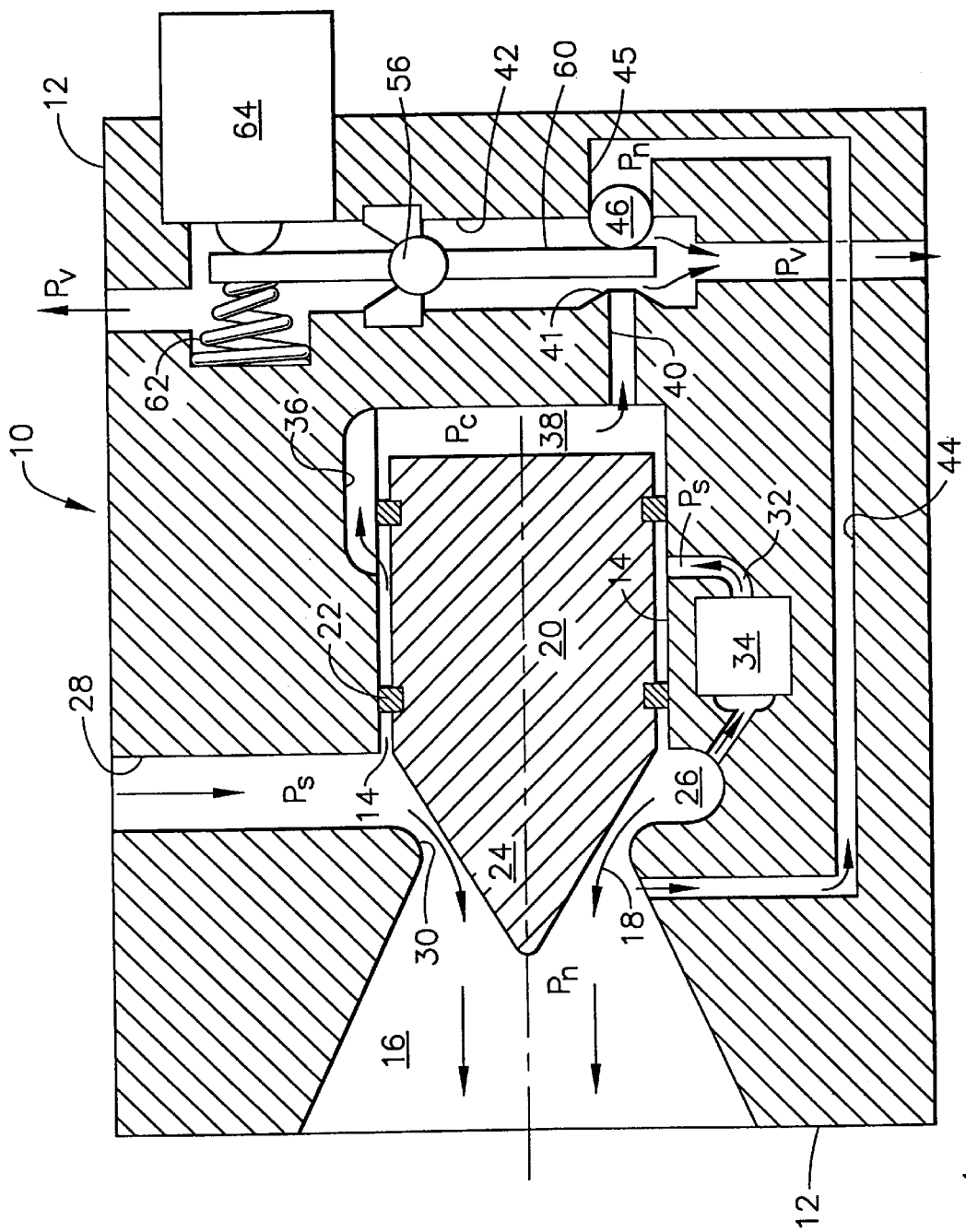
FIG. 1 is a cross sectional schematic of the hot gas proportional thruster valve contemplated by the present invention.

Referring to FIG. 1, a proportional hot gas thruster valve is generally denoted by the reference numeral 10. The valve 10 includes a housing or casing 12 having a cylindrical sleeve or cavity 14 open at one end. The casing 12 also has a nozzle 16 having a metering section 18 in opposed and spaced apart relation to the open end of the cavity 14. Slideably mounted in the cavity 14 is a poppet piston 20. The piston 20 is sealed within the sleeve 14 by a two graphite ring seals 22. The head 24 of the piston 20 is conical and extends from the open end of the cavity 14 towards the metering section 18 of the nozzle 16. Disposed between the metering section 18 and the open end of the cavity 14 is an annulus 26 that surrounds the conical head 24 of the piston. A first passage 28 brings the hot gas generated by the combusting of a solid propellant to the annulus 26 at pressure designated as Ps. The piston 20 is moveable between a closed position where conical head 24 seals against seat 30 to a fully open position where the hot gas flows unrestricted from the annulus 26 to the metering section 18.

Figure 2:
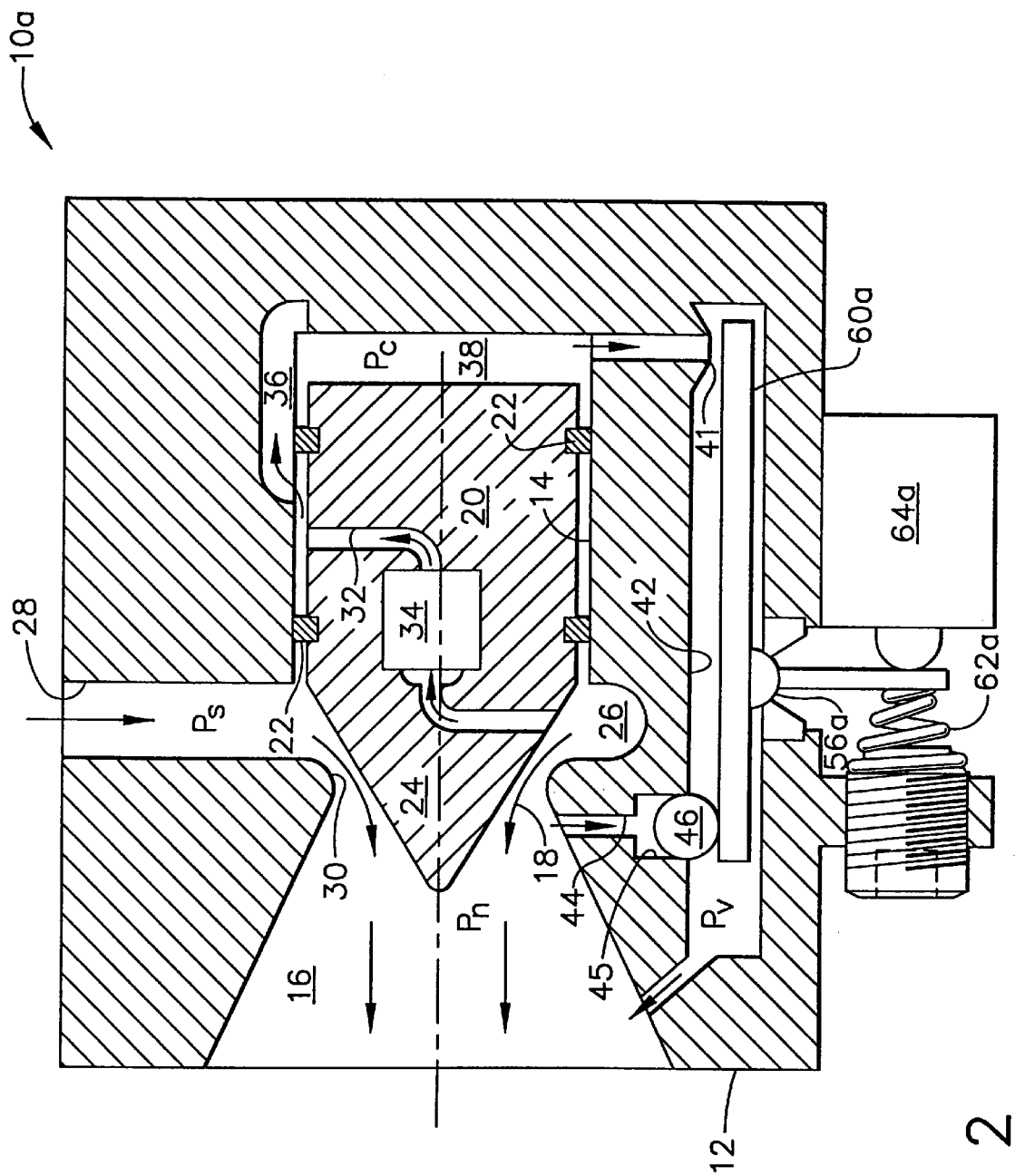
FIG. 2 is a cross sectional schematic of an alternative embodiment of the hot gas proportional thruster valve contemplated by the present invention.

A second passage 32 places the annulus 26 in fluid communication with the cavity 14 at a point between the two sealing rings 22. Disposed in the second passage 32 is a filter 34 which may not be necessary depending on the cleanliness of the hot gas. In the preferred embodiment, the passage 32 and filter 34 are disposed in the housing 12. Alternatively, they can be disposed in the poppet piston 20 as shown in FIG. 2. A metering orifice or restrictive pneumatic slot 36 places the portion of the cavity 14 between the sealing rings 22 in fluid communication with the actuator chamber 38 which is bounded axially by the back surface of the piston 20 and the back wall of the cavity 14. The metering orifice 36 can have a fixed area or can be configured as a needle. Importantly, the metering orifice 36 is sized and positioned so that as the piston 20 strokes away from the seat 30, the orifice opens. The gas flowing through the metering orifice 36 experiences a pressure drop so that the gas pressure in the actuator chamber 38, represented by Pc, is less than Ps. A third passage 40 places the actuator chamber 38 in fluid communication with a flapper chamber 42 and a fourth passage 44 places the nozzle 16 in fluid communication with the flapper chamber 42. The exit 41 of passage 40 is a nozzle and is in an opposed relationship across the flapper chamber 42 with exit 45 of passage 44. The exit 45 is enlarged to receive a pressure sensitive sealing device such as a close tolerance ball 46. The ball 46 being moveable to allow metering of exit 45. Alternatives to the ball 46, which allows tolerable leakage, are pistons or bellows. The inlet of passage 44 is downstream of the inlet 18 so the pressure in the passage is represented by Pn.

Both ends of the flapper chamber 42 vent to ambient. The pressure at these ends being represented by Pv. A flapper 60 is rotatably mounted and sealed at its axial center of rotation in the flapper chamber 42 by a conventional ball and socket 56. One end of the flapper 60 is disposed between the exits 41 and 45. The opposite end of the flapper 60 is disposed between a spring 62 and a solenoid force motor 64.

Still referring to FIG. 1, in the proportional hot gas thruster valve 10, there is a force balance on the flapper 60 under steady state conditions. As a result, there is a known proportional relationship between the thrust exiting the nozzle 16 and the force applied by the solenoid to the flapper 60. This is because thrust is proportional to the nozzle plenum pressure Pn. This pressure is fed back to the flapper 60 through passage 44 where it applies a force that reacts against the force of the solenoid motor 64. Meanwhile, a small fraction of the hot gas flows through passage 32 and then through metering orifice 36 into the actuator chamber 38 and then through passage 40 where it also applies a force to the flapper 60. Thus a force balance is set up between the solenoid, the spring, Pn and Pcs. When a change in thrust is required, a control unit, not shown, sends the appropriate signal to the solenoid and the solenoid applies the appropriate force to the flapper 60 and upsets the balance. For example, if more thrust is needed, the solenoid will push down on the flapper forcing it away from nozzle 41 increasing its area which results in the venting of the actuator chamber 38 and a decrease in Pc. As Pc falls, the poppet piston 20 is pushed away from the seat 30 opening the metering section 18. As more hot gas now flows through the nozzle 16, thrust increase. As thrust increases, Pn increases and is communicated through passage 44, which in turn causes an increase in the force applied to the flapper via ball 46. Thus in turn causes the flapper 60 to rotate towards exit 41 reducing exit 41's nozzle area. As a result, with restriction 36 opening in accordance with motion of poppet 20 and the reduced area of exit 41, Pc returns to its original pressure, the poppet piston 20 stops moving and a pressure balance is restored To reduce thrust the process is reversed. Thus, the piston 20 can be moved continuously between a fully open position to a closed position depending on the amount of thrust desired. Importantly, with continuous movement, the abrupt movements of the prior art on/off valves are eliminated.

FIG. 2 shows an alternative embodiment 10a of the thrust valve 10. Many of the components of this alternate embodiment are the same as in the preferred embodiment and are represented by the same reference numerals. The following is a description of the differences. In the thrust valve 10a, a pulse width modulated solenoid 64a is used instead of a force motor solenoid 64. The force motor solenoid 64 provides better fidelity and purely proportional control but is larger and heavier and slower in response than solenoid 64a. When the pulse width modulated solenoid 64a is used, its pulse frequency is set high enough so as not to cause oscillation of the piston 20. Another difference is that the passage 32 and filter 34 are disposed within the piston 20 instead of in the housing 12. Also, the exits 41 and 45 both face the same side of the flapper 60a but on opposite ends.

The flapper 60a is "T" shaped, with the base 61a disposed between the solenoid 64a and the spring 62. As a result of this different shape, the ball and socket 56a is slightly modified, in a manner familiar to those skilled in the art, form of the ball and socket 56. The operation of the valve 10a is the same as for the valve 10 as discussed previously. It should be apparent that the location of the solenoid relative to the flapper determines whether an increase in force results in an increase in thrust or a decrease in thrust. That is, referring to FIG. 2, an increase force cause the flapper to move away from the exit 41 which reduces the actuator chamber pressure which results in increased thrust. However, one could swap the location of the solenoid 64a and spring 62 in which case an increase in force will cause the flapper to close exit 41, which will increase the pressure in the actuator chamber causing the piston to move toward the nozzle and decrease thrust.

Various modifications and alterations of the above described sealing apparatus will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A thruster valve comprising:
   a housing having a sleeve disposed therein, said sleeve open at a first end and a thrust nozzle for producing thrust, the inlet of said nozzle in opposed relation to and spaced from said first end;
   a piston extending from a head to a back and mounted in said sleeve and continuously moveable from a closed position where the head of said piston abuts said nozzle inlet to an open position where said head is spaced from said nozzle inlet;
   a first passage for receiving a hot gas having a first pressure and delivering the hot gas to said thrust nozzle;
   a flapper chamber disposed in said housing and opened at at least one end to ambient and having a flapper pivotally mounted therein;
   a second passage for delivering a portion of said hot gas in said first passage to said flapper chamber; said portion of nozzle gas having a second pressure less than said first pressure;
   a third passage for delivering a portion of said hot gas in said first passage to an actuator chamber behind the back of said piston, said third passage having a metering orifice whereby the gas in said actuator chamber is at a third pressure less than said second pressure;
   a fourth passage placing said actuator chamber in fluid communication with said flapper chamber; and
   means for applying a predetermined force to said flapper and a resilient member opposing said predetermined force.

2. The thruster valve of claim 1 wherein said housing further comprises an annulus circumscribing the head of said piston and disposed between said first passage and said thrust nozzle.

3. The thruster valve of claim 1 further comprising at least two spaced part ring seals between said piston and said sleeve.

4. The thruster valve of claim 3 wherein said third passage further comprises a fifth passage between said first passage and said sleeve at a first location between said ring seals.

5. The thruster valve of claim 4 wherein said fifth passage is disposed in said housing.

6. The thruster valve of claim 4 wherein said fifth passage is disposed in said piston.

7. The thruster valve of claim 4 further comprising a filter disposed in said fifth passage.

8. The thruster valve of claim 4 wherein said third passage includes a sixth passage between a second location between said ring seals and said actuator chamber, said sixth passage having said metering orifice.

9. The thruster valve of claim 8 wherein the inlet to said sixth passage is sized and positioned so that the inlet opens as the piston moves away from the closed position.

10. The thruster valve of claim 1 further comprising a pressure sensitive sealing device in the exit of said second passage.

11. The thruster valve of claim 10 wherein the pressure sensitive sealing device is a close tolerance ball.

12. The thruster valve of claim 1 wherein the exits of said second and fourth passages are in opposed relation ship across one end of said flapper.

13. The thruster valve of claim 1 wherein the exits of said second and fourth passage both face the same side of said flapper but at opposite end of said flapper.

14. The thruster valve of claim 1 wherein the exit of said fourth passage has a nozzle shape.

15. The thruster valve of claim 1 wherein said force means is a solenoid force motor.

16. The thruster valve claim 1 wherein said force means is a pulse width modulated solenoid.

17. A method for controlling the output of a thruster valve comprising the steps of:

a) providing a thruster valve having an inlet passage for receiving a hot gas flow in fluid communication with a thrust nozzle and having a piston mounted in a sleeve, the piston continuously positionable between a closed position where said piston seals said nozzle from said inlet passage and zero thrust is produced, to a fully open position where said piston least inhibits the flow between the inlet passage and the thrust nozzle and maximum thrust is produced;

b) establishing a force balance across a flapper using nozzle pressure, the pressure in a chamber behind said piston, a spring and an input force;

c) establishing a pressure balance across said piston using the nozzle pressure, the chamber pressure, and the gas inlet pressure, the gas inlet pressure being greater than the chamber pressure and the chamber pressure being greater than the nozzle pressure;

d) changing the thrust output of the valve by changing the input force which changes the chamber pressure causing the piston to move; and e) stopping the movement of said piston and reestablishing said pressure balance when the desired thrust is reached.

18. The method of claim 17 wherein the steps (c) and (d) further comprise:

increasing the thrust output of the valve by the following steps;

changing the input force so as to decrease the chamber pressure causing the piston to move away from said nozzle seat;

increasing flow through said nozzle and hence thrust;

increasing nozzle pressure; and increasing the chamber pressure until the pressure balance is restored and the piston stops moving.

19. The method of claim 17 wherein the steps (c) and (d) further comprising:

decreasing thrust output of the valve by the following steps;

changing the input force to increase the chamber pressure causing the piston to move towards said nozzle seat;

decreasing flow through said nozzle and hence thrust;

decreasing nozzle pressure; and decreasing the chamber pressure until the pressure balance is restored and the piston stops moving.

\* \* \* \* \*